United States Patent [19]
Roberts

[11] Patent Number: 5,190,263
[45] Date of Patent: Mar. 2, 1993

[54] LOCKING MECHANISM FOR AN ACTUATOR

[75] Inventor: William F. Roberts, West Boylston, Mass.

[73] Assignee: Neles-Jamesbury, Inc., Worcester, Mass.

[21] Appl. No.: 865,266

[22] Filed: Apr. 8, 1992

[51] Int. Cl.⁵ .................. F16K 31/12; F16K 35/00; F01B 19/00; F01B 31/14

[52] U.S. Cl. .......................... 251/60; 251/92; 251/112; 251/288; 92/13.2; 92/13.5; 92/13.7; 92/13.8; 92/20; 92/25; 137/559

[58] Field of Search .............. 92/5 L, 13.5, 13.2, 92/13.7, 13.8, 15, 20, 23, 25, 29; 251/90, 91, 92, 93, 111, 112, 113, 60, 285, 288

[56] References Cited

U.S. PATENT DOCUMENTS

| | | | |
|---|---|---|---|
| 1,947,081 | 4/1933 | Grady | 70/125 |
| 2,120,669 | 7/1935 | Hill | 251/152 |
| 2,129,499 | 10/1935 | Landon | 251/152 |
| 2,337,512 | 12/1940 | Ward | 277/45 |
| 2,377,036 | 4/1943 | Quarfoot | 70/178 |
| 2,443,036 | 5/1944 | Hopkins | 251/16 |
| 3,397,863 | 5/1966 | Bell | 251/285 |
| 3,460,800 | 8/1966 | Mikuls | 251/101 |
| 3,537,473 | 11/1970 | DeZurik | 137/556.6 |
| 3,565,089 | 2/1971 | Thompson | 137/68 |
| 3,576,310 | 4/1971 | Newton | 251/263 |
| 4,140,297 | 2/1979 | Bussell | 251/90 |

FOREIGN PATENT DOCUMENTS 0350596 1/1990 European Pat. Off. .
610078 3/1979 Switzerland .

*Primary Examiner*—Thomas E. Denion
*Attorney, Agent, or Firm*—Oblon, Spivak, McClelland, Maier & Neustadt

[57] ABSTRACT

A locking mechanism for an actuator prevents the unauthorized operation of the actuator and also permits a viewer to determine whether the actuator is in a locked open, locked closed or unlocked position. The invention utilizes a clear cover guard which is positioned and locked on an actuator body which is attached to a housing. The actuator body comprises threaded bores which permit a bolt to be inserted into the actuator body until it contacts an integral locking cam and driver arm rotatably disposed within the actuator body. The bolt contacts the locking cam in order to selectively lock the integral locking cam and driver arm in a desired position.

9 Claims, 7 Drawing Sheets

LOCKING MECHANISM FOR AN ACTUATOR

BACKGROUND OF THE INVENTION

1. Field of the Invention

The present invention relates to a mechanical lock-out device and locking mechanism for an actuator such as a diaphragm type actuator valve. The lock-out device and locking mechanism of the present invention prevents the unauthorized operation or tampering of the actuator and mechanically locks the actuator in either an opened or closed position.

2. Description of the Related Art

Conventional lock-out devices and locking mechanisms for actuators have drawbacks in that they do not readily accommodate the adjustability of travel stops which are used to lock the actuator in a selected opened or closed position. Additionally, conventional lock-out devices and locking mechanisms do not permit complete visibility of the actuator and accordingly an operator cannot tell without removing the lock-out device if the actuator is in a locked or unlocked position. Finally, conventional lock-out devices do not provide for the storage of loose parts which are not in use.

SUMMARY OF THE INVENTION

Accordingly, an object of the present invention is to provide for a novel lock-out device and locking mechanism which prevent the valve and actuator from changing positions, locks the actuator in a fully open or fully closed position, and provides a means for assuring that the adjustable open and closed travel stops will not be tampered with.

A further object of the present invention is to provide for a lock-out device which permits a complete visibility of the actuator in order to enable a user to determine which mode the actuator is in.

A further object of the present invention is provided for a lock-out device which can accommodate open and closed travel stop adjustments and also permits the storage of loose parts which are not in use.

The locking mechanism of the present invention comprises an actuator body means connected to a housing; and locking cam means mounted within the actuator body means. The locking cam means comprising at least two flat portions and being integral with a driver arm means which is rotatably mounted in the actuator body means. The driver arm means being pivotally connected to an actuator rod. The actuator rod extending from the driver arm means to the housing.

The actuator body means comprising a first bore means for receiving a first bolt means. The first bolt means being insertable in the first bore means for abutting against one of the at least two flat portions of the locking cam means and locking the locking cam means and driver arm means in a valve open position. The actuator body means further comprising a second bore means for receiving the first bolt means. The first bolt means being insertable in the second bore means for abutting against the other of the at least two flat portions of the locking cam means and locking the locking cam means and driver arm means in a valve closed position.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
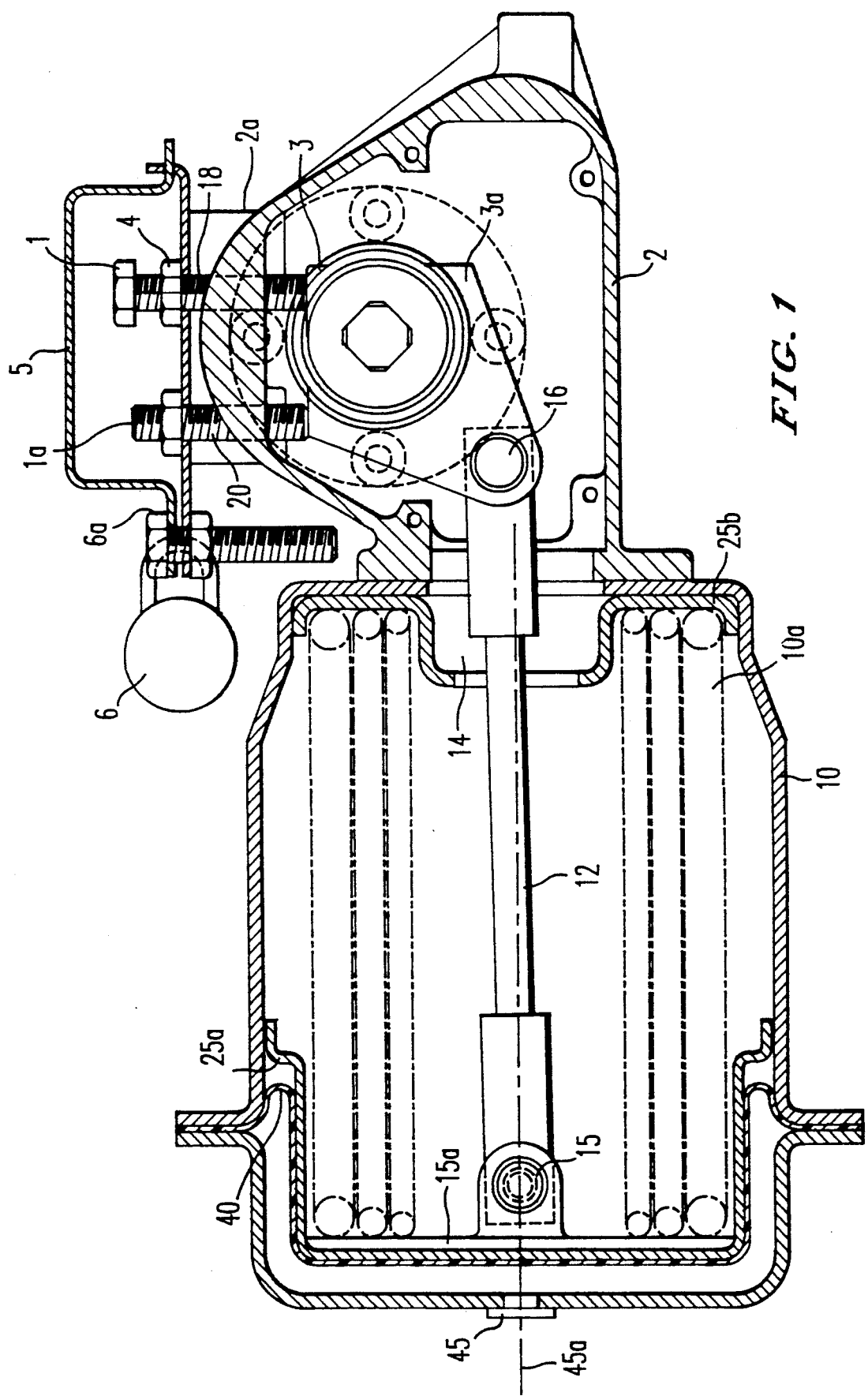
FIG. 1 is a cross-sectional view of the housing, actuator body means and locking cam of the present invention with the bolt means inserted in the bore of the actuator body means.

Referring now to the drawings, wherein like reference numerals designate identical or corresponding parts throughout the several views, and more particularly to FIG. 1 thereof, FIG. 1 illustrates a housing 10 for an actuator having an actuator rod 12 pivotally disposed therein. The housing 10 can be either removably connected through bolt means or integral with an actuator body means 2. Reference numeral 45a denotes an axis for the housing 12.

Figure 5A:
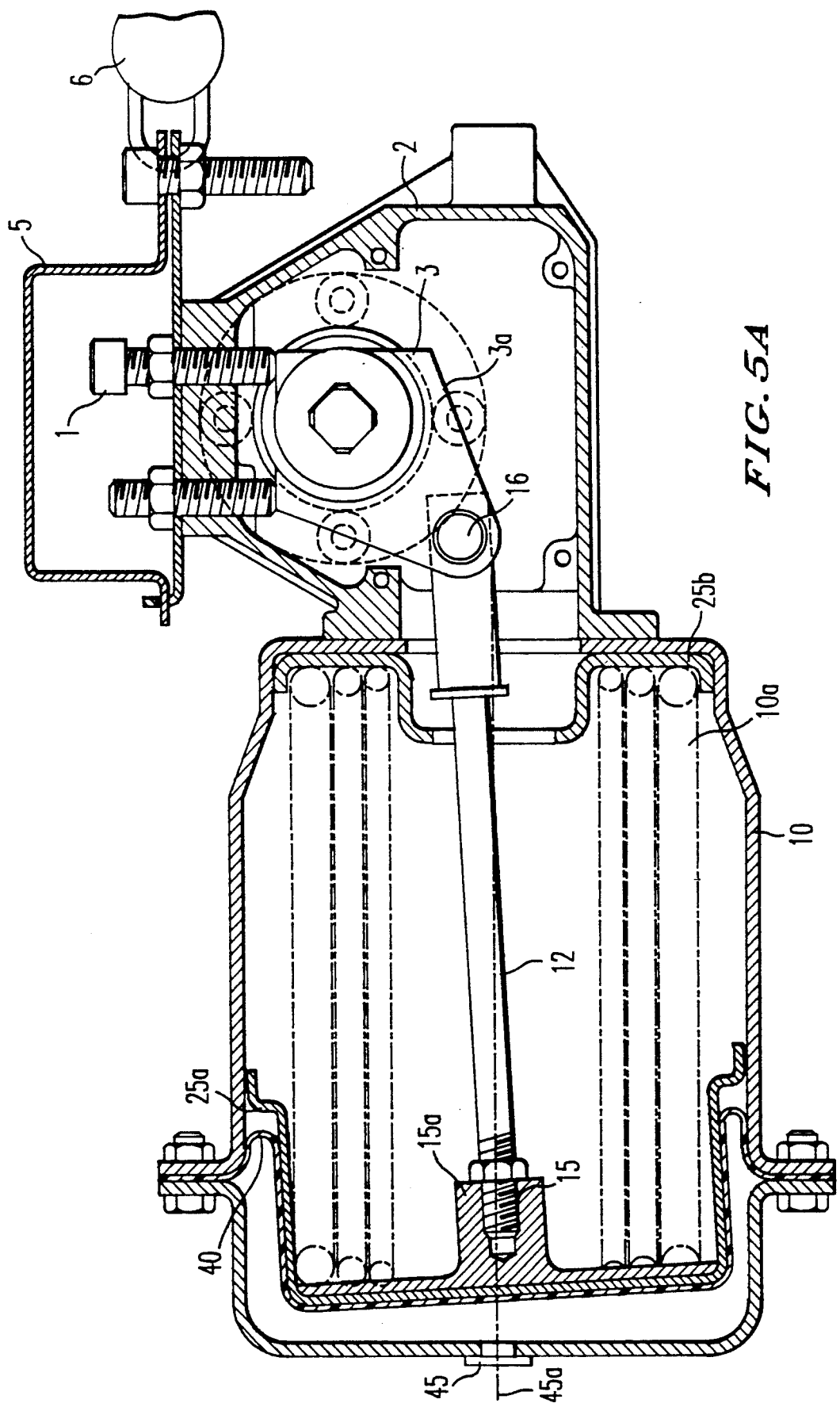
FIGS. 5A, 5B and 5C are cross-sectional views of the housing, actuator body means and locking cam showing the different locking and unlocking positions of the locking cam and the driver arm.
Figure 5B:
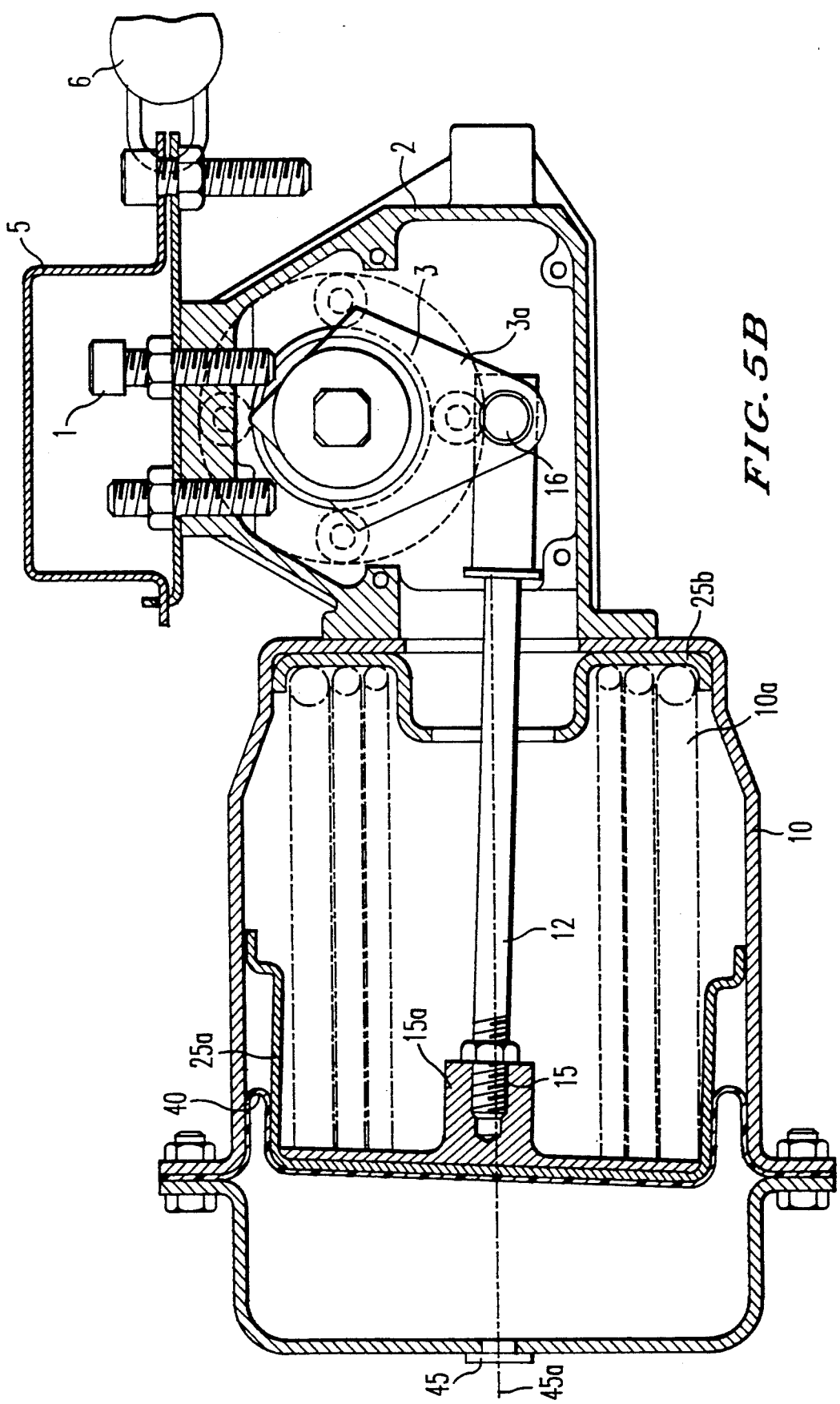
Figure 5C:
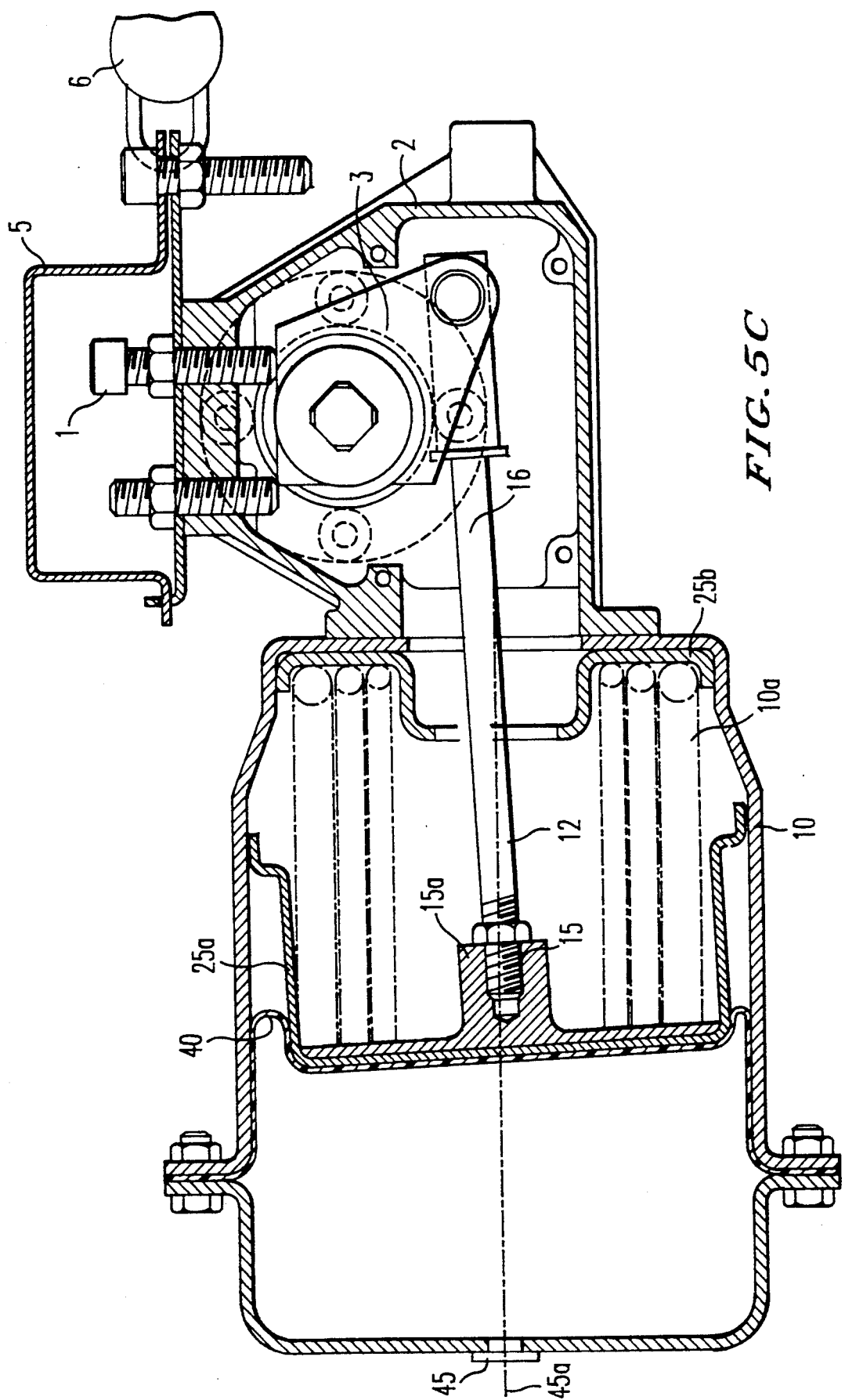

Rotatably disposed within the actuator body means 2 is a locking cam 3 having flat portions thereon. The locking cam 3 being integrally connected to a driver arm 3a. The driver arm 3a being pivotally connected to the actuator rod 12 at pivot connection 16. The actuator rod 12 extending from a connecting point 15 in the housing 10, through an opening 14 which connects the housing 10 to the actuator body means 2, and into the actuator body means 2 where it is pivotally connected to the driver arm 3a which is integral with the locking cam 3 through the pivot connection 16. The housing 10 further comprises spring means 10a which as illustrated in FIGS. 5A-5C permit the movement of the actuator rod 12 toward the actuator body means 2.

The spring means 10a being mounted on the combination of a spring retainer 25b and a diaphragm retainer 25a for a diaphragm 40 which are disposed within the housing 10. The connecting point 15 being integral with a supporting part 15a disposed within the diaphragm retainer 25a. The diaphragm retainer 25a being slidable within the housing 10 and the housing 10 further comprising an air inlet port 45. Accordingly, the integral driver arm 3a and locking cam 3 are rotated by introducing air into the inlet port 45, pressurizing the diaphragm 40 and compressing the spring means 10a (FIGS. 5A-5C). Force and movement is transmitted from the diaphragm 40 to the driver arm 3a by means of the actuator rod 12.

Figure 2:
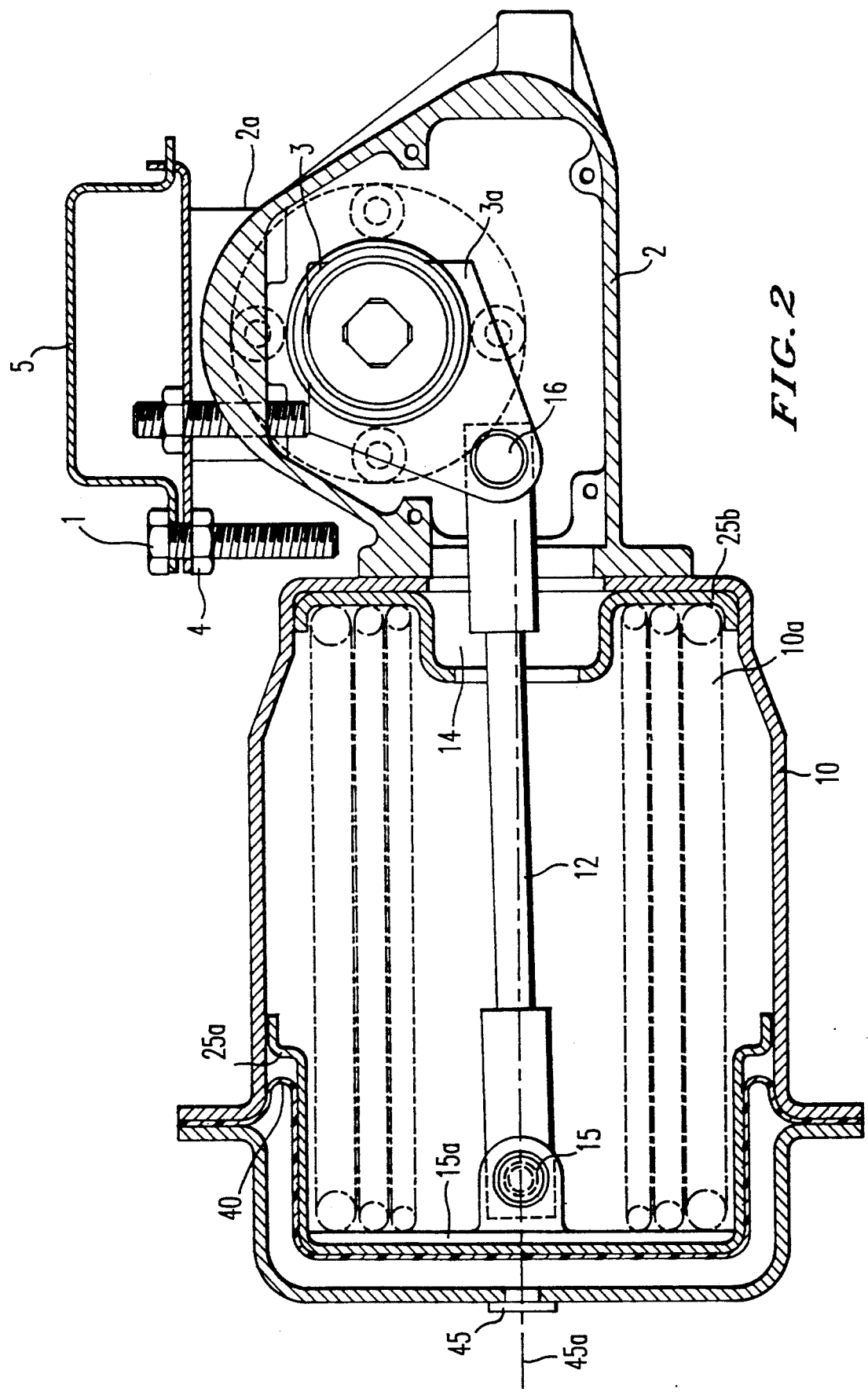
FIG. 2 is a cross-sectional view of the housing and actuator body means with the bolt means removed from the bore in the actuator body means.

As illustrated in FIGS. 1 and 2, the actuator body means 2 comprises a top flat portion 2a through which bores 18 and 20 are threaded. The bores extending from the top of the actuator body means 2 into the opening of the actuator body means 2 in which the locking cam 3 and the driver arm 3a are rotatably disposed. The bore is capable of receiving a bolt means 1 or 1a such that the bolt means 1 can extend through the bore (18 or 20) and abut against a flat portion of the locking cam 3. That is, the bolt means 1 can be threaded into the actuator body means 2 until the end of the bolt means 1 contacts one of the flat portions on the locking cam 3.

At least two separate bores can be provided in the actuator body means 2. One of the bores may be for locking the actuator in a valve closed position, and the other of the bores can be for locking the actuator in a valve opened position. The valve opened position and the valve closed position can be selectively locked by using the bolt means 1 in either of the bores in the actuator body means.

Figure 3:
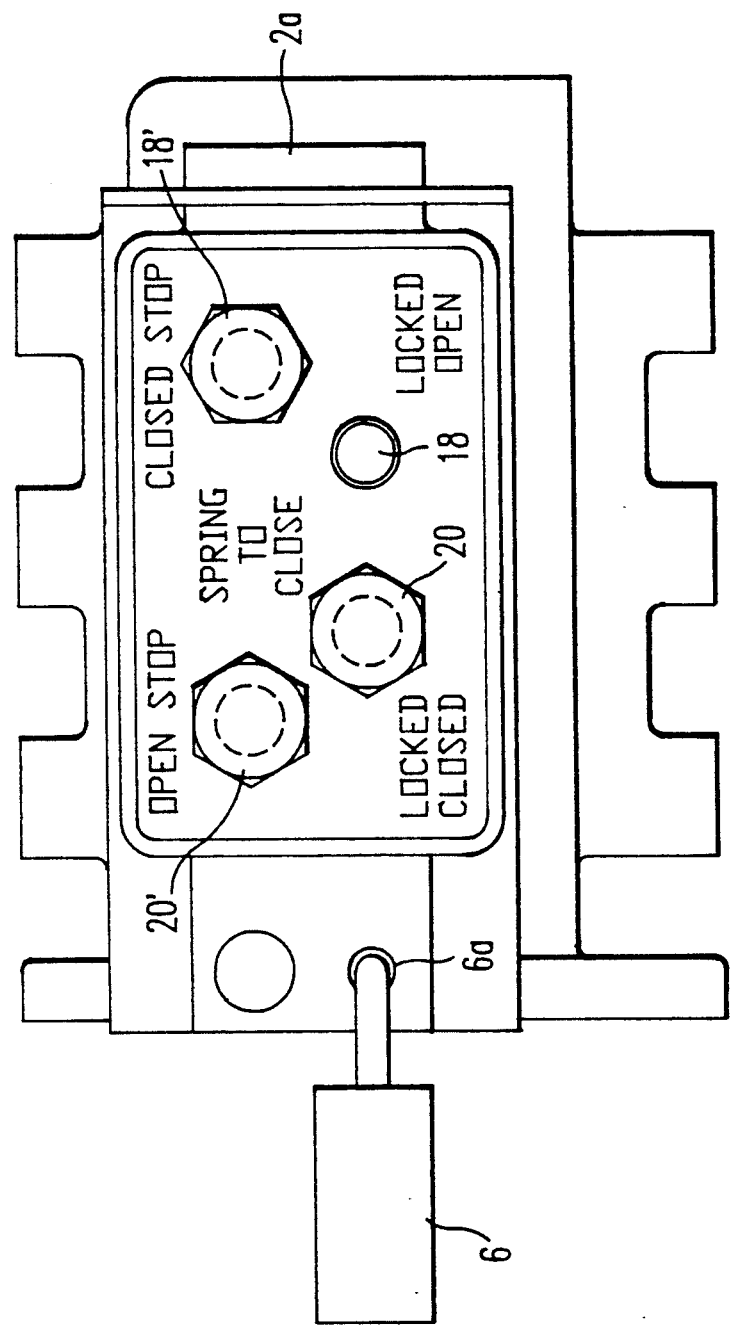
FIG. 3 is a top view of the bores in the actuator body means showing the identifying indicia representing selective locked and opened positions.

As further illustrated in FIG. 3, a second pair of threaded bores 18', 20' can be provided for adjustable travel (limit) stops, and two additional threaded bolt means can be inserted into the actuator body means 2 for this purpose. Locking nuts 4 are provided for each of the bolts to secure them in position.

As illustrated in FIGS. 1-3, in order to prevent the unauthorized use of the valve or tampering with the valve, a clear cover guard 5 having a height to accommodate the adjustment range of the travel stops is provided on the actuator body means 2. The clear cover guard 5 can be a plastic cover guard but is not limited to plastic. The clear cover guard 5 is padlocked onto the top of the actuator body means 2 through a combination of a padlock 6 and a bore 6a. The use of the clear cover guard 5 permits a user to view the mode of the actuator as seen in FIG. 3. As further seen in FIG. 3, the top of the actuator body means 2 comprises identifying indicia for permitting the user to identify the mode that the actuator is positioned in. Thus, the user can easily determine whether the actuator is in the locked open, locked closed or unlocked position through the clear cover guard 5. The clear cover guard 5 therefore achieves the dual purpose of preventing tampering with the actuator and also permits the viewing of the mode of the actuator.

As illustrated in FIG. 2, when lockout is not required, the bolt 1 can be stored outside of the clear cover guard.

Figure 4:
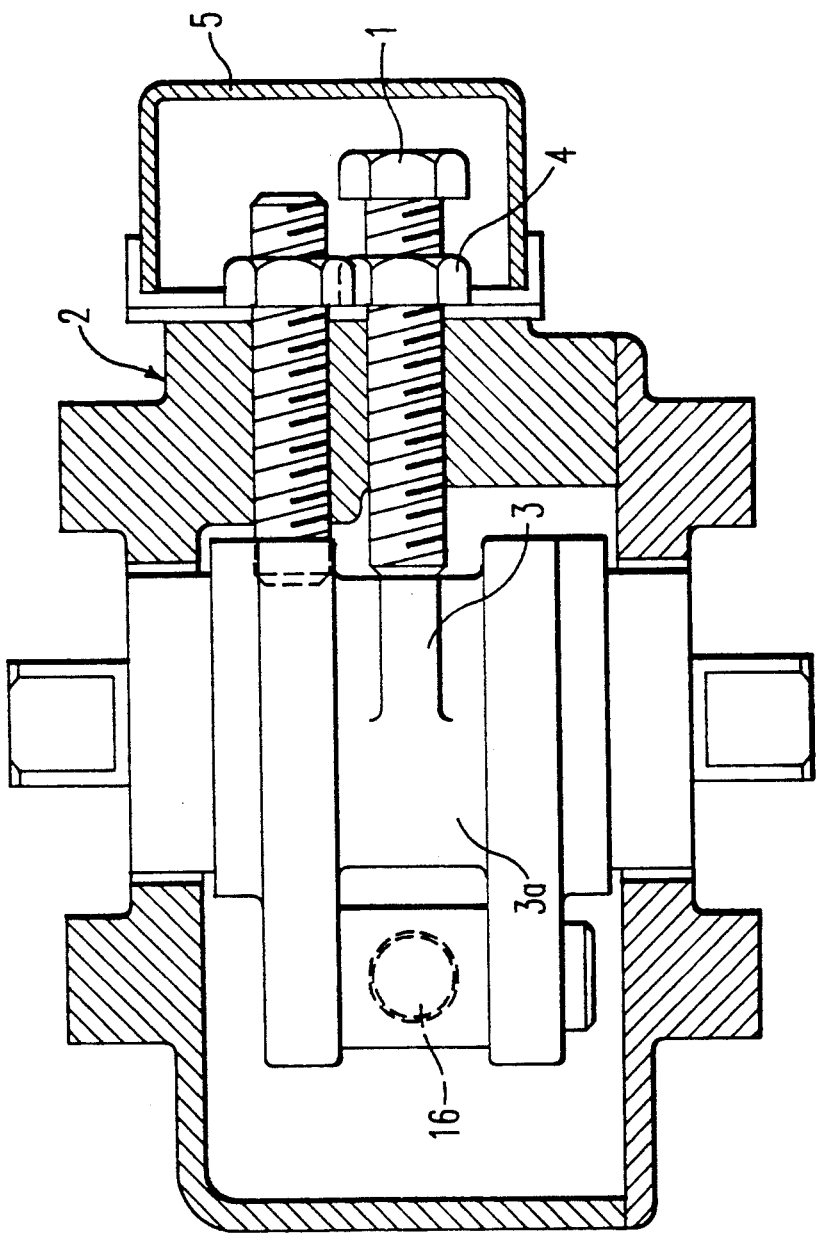
FIG. 4 is a cross-sectional view of the integral locking cam and driver arm supported within the actuator body means of the present invention.

FIG. 4 is a cross-sectional view of the locking cam 3 which also illustrates the flat portions of the locking cam 3 and clearly illustrates the abutting relationship between the bolt means 1 and the locking cam 3. FIG. 4 further illustrates that the locking cam 3 is an integral part of the driver arm 3a.

FIGS. 5A-5C illustrate the different positions of the integral locking cam 3 and driver arm 3a as they are rotated and locked in different modes of operation. As clearly seen from FIGS. 5A-5C, the integral locking cam and driver arm (3, 3a) cooperate with the actuator rod 12, and in response to air introduced into the inlet part 45, the integral locking cam and driver arm (3, 3a) is positioned in several selected positions. When the integral locking cam and driver arm (3, 3a) are in a desired position, locking can be accomplished by threading the bolt means 1 through the actuator body means 2 until it contacts the locking cam 3.

FIG. 5A shows the actuator locked in a fully closed position. In this position, if air is introduced into the air inlet port 45, the actuator will not open. FIG. 5C shows the actuator in a fully open position. The actuator can be locked in this position. If air is evacuated from the diaphragm area through the inlet port 45, the locking device will prevent the spring means 10a from closing the actuator. FIG. 5B shows the actuator in a 45° open position. The actuator cannot be locked in this position.

The actuator can only be locked in the open or closed position (FIGS. 5A, 5C). As further illustrated in FIGS. 5A-5C, as the actuator rod 12 is moved by means of the air and diaphragm, the angular position of the actuator rod 12 with respect to the axis 45a of the housing 10 varies.

When the actuator is in the desired position, the clear cover guard 5 can then be assembled over the entire face of the actuator body means 2 and secured with the padlock 6. The mode of the actuator can then easily be identified through the clear cover guard 5.

Thus, the present invention provides for a valve and actuator which can be locked in a selected position as well as a cover mechanism which can prevent the unauthorized tampering and movement of the valve and actuator from the selected locked position. Additionally, the cover member of the present invention allows easy visibility as to the mode in which the actuator is in and can accommodate the adjustability of travel stops. Finally, the invention provides for a storage of loose parts when not in use.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by letters patent of the U.S. is:

1. A locking mechanism for a valve actuator comprising:
   actuator body means connected to a housing; and
   locking cam means mounted within said actuator body means, said locking cam means comprising at least two flat portions and being integral with a driver arm means which is rotatably mounted in the actuator body means, said driver arm means being pivotally connected to an actuator rod, said actuator rod extending from said driver arm means to said housing;
   said actuator body means comprising:
   a first bore means for receiving a first bolt means, said first bolt means being insertable in said first bore means for abutting against one of said at least two flat portions of said locking cam means and locking said locking cam means and driver arm means in a valve open position; and
   a second bore means for receiving said first bolt means, said first bolt means being insertable in said second bore means for abutting against the other of said at least two flat portions of said locking cam means and locking said locking cam means and driver arm means in a valve closed position.

2. The locking mechanism according to claim 1, wherein said actuator body means comprises:
   at least one further bore means for receiving a second bolt means, said second bolt means being insertable in said at least one further bore means, for abutting against a further flat portion on said locking cam means and regulating a position of said locking cam means and driver arm means and an opening or closing amount of said valve.

3. The locking mechanism according to claim 2, further comprising:
   locking nut means fittable on said first and second bolt means for securing said bolt means in a respective one of said bore means.

4. The locking mechanism according to claim 1, further comprising:
a clear cover guard fittable on said actuator body means for covering said bore means and said bolt means inserted therein and permitting viewing of said bore means and said bolt means.

5. The locking mechanism according to claim 4, wherein said clear cover guard comprises a first hole which is aligned with a second hole on said actuator body means, wherein a locking means is insertable in said first and second aligned holes for locking said clear cover guard on said actuator body means.

6. The locking mechanism according to claim 5, wherein said clear cover guard comprises a further hole for storing one of said bolt means when not in use.

7. The locking mechanism according to claim 4, wherein each one of said bore means comprises identifying indicia for identifying the locking cam means and driver arm means position corresponding to a respective bore means.

8. The locking mechanism according to claim 1, wherein said housing comprises:
spring retaining means for supporting a spring, and diaphragm retaining means facing said spring means, a spring being positioned between said spring retaining means and said diaphragm retaining means and a diaphragm being positioned in said housing at said diaphragm retaining means; and
air inlet means for introducing air into said housing; wherein the end of said actuator rod opposite said pivot connection with said driver arm means is mounted to a supporting part disposed within said diaphragm retaining means, such that air introduced into said inlet port pressurizes said diaphragm and diaphragm retaining means so as to compress said spring and transmit movement to said actuator rod in order to rotate said integral driver arm means and locking cam means.

9. The locking mechanism according to claim 5, wherein said clear cover guard is plastic.

* * * * *